Jan. 16, 1923.

N. GERANIO.

PROTECTIVE COVER FOR PNEUMATIC TIRES AND THE LIKE.
FILED SEPT. 2, 1921.

1,442,394.

Inventor
Nicolás Geranio

By Emil Börnelyche

Attorney

Patented Jan. 16, 1923.

1,442,394

UNITED STATES PATENT OFFICE.

NICOLÁS GERANIO, OF ROSARIO DE SANTA FE, ARGENTINA.

PROTECTIVE COVER FOR PNEUMATIC TIRES AND THE LIKE.

Application filed September 2, 1921. Serial No. 498,177.

*To all whom it may concern:*

Be it known that I, NICOLÁS GERANIO, subject of the King of Italy, residing at 1061 Cochabamba Street, Rosario de Santa Fe, Argentina, have invented certain new and useful Improvements in Protective Covers for Pneumatic Tires and the like, of which the following is a specification.

My invention relates to certain improvements in protective covers for resilient wheel tires and particularly for the pneumatic tires of motor-cars and the like, its object being to provide a protective cover which may be readily adjusted on the said tires and which affords them an adequate and efficient protection against wear and punctures.

Figure 1:
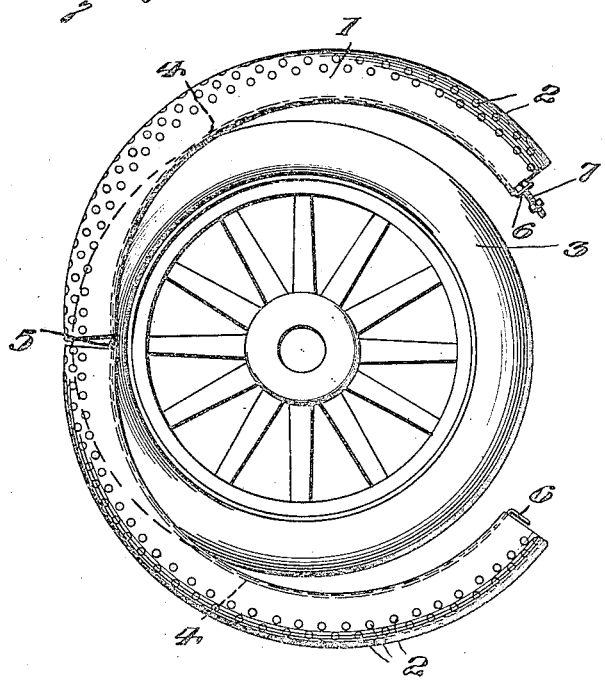

In order that my present invention may be clearly understood and easily carried into practice a preferred embodiment of the same has been illustrated in the appended drawings, wherein, Fig. 1 is a side elevation of a motor-car wheel with pneumatic tire and a protective cover according to my present invention, such cover being shown in the course of adjustment.

Figure 2:
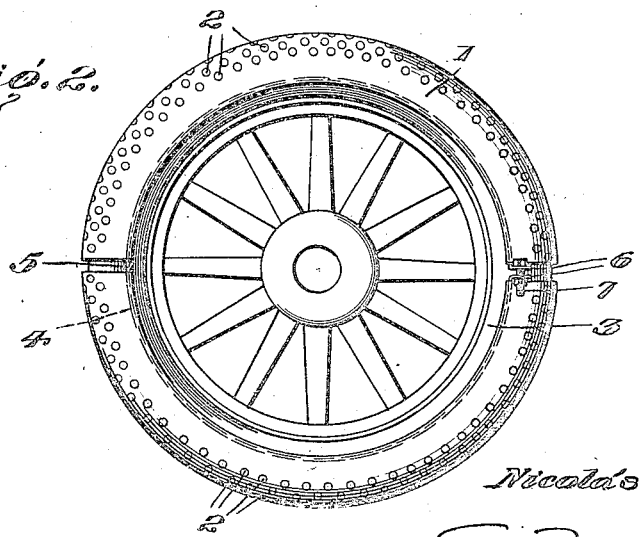

Fig. 2 is a similar view in which the protective cover is shown fully adjusted.

Similar characters of reference denote same or like parts throughout the said drawings.

According to my present invention the protective cover comprises a band of leather, canvas or any other suitable material which is provided on the greater part of its surface with a series of studs or rivets 2 which may be also of any suitable material such as metal, etc. The said band is to be adjusted on the tread of the tire 3, the lateral ends being extended a suitable distance over the sides of the said tire in order to afford it an efficient protection. In view of facilitating the adjustment the protective cover is constructed in two symmetrical half sections.

Each of the said sections consists of a strip or band 1 with the corresponding rivets or washers 2 the lateral edges of the band being provided with stiffening or reinforcing wires or semicircular rods 4 which at the same time serve to adjust in position the said protective cover, they being secured to the band in any suitable manner. Both halves of the cover are hinged as shown in 5 by means of the said stiffening wires 4, which at their other free ends are formed with ears 6 placed at an angle to the plane of the wire, the ears being formed with a screw-threaded orifice through which tensioning screws 7 may be passed and adjusted in order to firmly adjust in position the protective cover on the pneumatic or other tire 3.

The adjustment of the protective cover may be readily accomplished and is obvious from the accompanying drawings. The open cover is placed on the tire previous or subsequent to the inflation of the same and the free ends are brought and secured together by means of the tensioning screws or bolts 7, the wires 4 being sufficiently tensioned so that they firmly secure the cover in position and avoid any sliding of the cover on the tire.

It is obvious that some constructural alterations may be introduced, according to the particular objects in view, without departing from the scope of my present invention which has been clearly set forth in the appended claim.

Having now fully described and ascertained the nature of my said invention and in what manner the same is to be carried into practice, I declare, that what I claim and desire to protect by Letters Patent is:

A protective cover for tires comprising two bands; semi-circular rods fixed to the lateral edges of the said bands and secured together at one end; ears at the other ends of said rods; and tensioning means connecting said ears to secure the bands to the tire.

In testimony whereof I affix my signature.

GERANIO, NICOLÁS.